No. 719,343. PATENTED JAN. 27, 1903.
A. LANGERFELD.
SEPARATOR.
APPLICATION FILED APR. 3, 1899.
NO MODEL. 4 SHEETS—SHEET 4.

Witnesses M. E. Nell, Susie R. Russell,

Inventor Arthur Langerfeld

UNITED STATES PATENT OFFICE.

ARTHUR LANGERFELD, OF SCRANTON, PENNSYLVANIA.

SEPARATOR.

SPECIFICATION forming part of Letters Patent No. 719,343, dated January 27, 1903.

Application filed April 3, 1899. Serial No. 711,582. (No model.)

*To all whom it may concern:*

Be it known that I, ARTHUR LANGERFELD, a citizen of the United States, residing at Scranton, in the county of Lackawanna and State of Pennsylvania, have invented a new and useful Separator, of which the following is a specification.

The purpose of my invention is to provide a machine adapted to automatically separate or assort into different classes or grades mixed quantities of lump material the pieces of which vary in their specific gravities, in the nature of their surfaces or in their forms, or in any or all of these attributes. Machines made in accordance with my invention are particularly adapted for separating the natural product of anthracite-coal mines, which consists mainly of a mixture of pure coal, partly pure coal, (called "bone,") composite pieces of coal and rock, and pure rock, usually slate. By means of my improvements large quantities of such mixed material may be automatically and quickly separated into as many grades or kinds as may be desired.

For the purpose of rendering the invention clear to those skilled in the art I have shown in the accompanying drawings and will herein describe the separator arranged to separate coal, slate, &c., although it will be understood that the invention is equally applicable to the separation of various other mixed materials.

Referring to the drawings.

A separator made in accordance with my invention and adapted for a perfect separation of mixed broken or lump material, such as the natural output of anthracite-coal mines, comprises three primary elements—namely, a slide having a declivous frictional differentiating-surface, means for feeding the pieces of material spaced apart from each other to said slide in such manner as to preclude collisions between the pieces while upon the slide, means for inverting the pieces of material during their passage down the slide for the purpose of bringing the opposite sides of sliding pieces in contact with the slide, so that the speeds of such pieces will be affected by the retardative nature of their opposite sides and reversing the direction of rotation of rolling pieces, thereby retarding such pieces, and a projector at the lower end of the slide whose surface is gradually elevated relatively to the adjoining part of the slide and from which the material is projected toward one or more separating-partitions adjacent to said projector. In the drawings various combinations and modifications of these primary elements are illustrated.

By the term "declivous frictional differentiating-surface" as used in this specification and the claims I mean a surface which is inclined at such an angle to a horizontal plane that the pieces of material spaced apart from each other will pass down thereover slowly enough to let each piece acquire a velocity peculiar to itself, which velocity is determined by the acceleration of the piece due to its specific gravity and the frictional resistance of the piece on the said surface, as distinguished from a steep slide inclined at such an angle that the pieces will shoot down and merely be deflected without being materially retarded. Such a deflecting or directing chute does not answer my purpose, for the reason that the pieces would all practically acquire the same velocity.

In carrying out my invention as applied to the separation of coal the material is first passed through screens and graded according to size. The pieces of material should be of a size as nearly uniform as practicable, the largest pieces being of a size which will pass freely through the several passage-ways in the feeding mechanism and the smallest pieces being more than one-half as large as the largest or more than one-half as wide as the feed-channels, so that two pieces of material cannot enter the feed-channels together. The material thus sized is placed within a receiving-hopper A, Figs. 1 and 2 of the drawings, which hopper is provided with an inclined bottom $a'$ and one or more discharge-openings $b$, this discharge-opening in the drawings being at the base of the rear side $a$ of the hopper. Below said opening and hinged to the bottom $a'$ is an inclined agitatable distributing-chute $c$, the forward part $c'$ of which extends into a distributing bin or hopper B and is provided at its lower end with a series of discharge-notches $d$. The lower end of the distributing-chute is arranged close to the side $f'$ of the distributing-hopper, which side forms a fixed stop for the coal passing down the distributing-chute.

Figures 1, 2, 3, 4, 5:
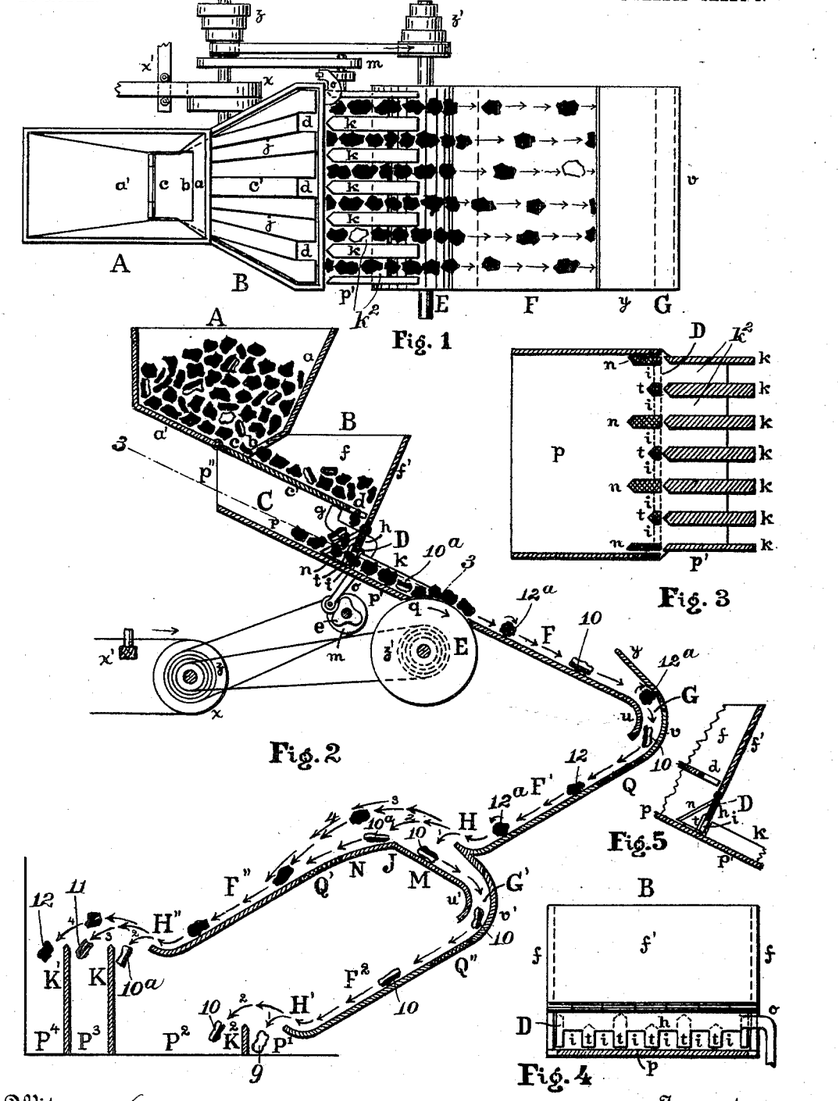
Figure 1 is a plan view of a complete separator embodying my improvements.
Fig. 2 is a vertical section through the same.
Fig. 3 is a section on the line 3 3 of Fig. 2, showing the arrangement of the teeth or blades upon the rake or ranging device and the channels into which the pieces of material are directed by said teeth to form single-piece files.
Fig. 4 is a rear view of the distributing-bin, showing the rake or ranging device for directing the material into the channels.
Fig. 5 is a vertical section through Fig. 4, taken on a line passing between adjacent teeth upon the ranging device.

The distributing-chute may be provided with diverging ridges $j$, as indicated in Fig. 1, for the purpose of directing the material to the notches in cases where the distributing-chute is wider than the discharge-opening in the receiving-hopper. Suitable means are provided for agitating the distributing-chute, so as to work the material out through the limited discharge-opening $b$ and downwardly through the discharge-notches $d$. Beneath the distributing-chute $c$ is a secondary distributing-hopper C, the upper end $p''$ of which is open and the sides of which may be, as shown, the sides $f$ of the primary distributing-hopper B. The inclined bottom $p$ of the secondary hopper is continued downwardly beyond the hopper, as shown at $p'$, the bottom $p$ and extension $p'$ forming a feed-chute, the upper part $p$ of which has a plain surface, while the lower part $p'$ has arranged thereon a series of wide parallel ridges $k$ evenly spaced apart, leaving intervening channels $k^2$ of sufficient width to receive the largest pieces of material, which channels are evenly spaced apart by the ridges.

Extending transversely of the secondary chute and hinged to the stop-plate $f'$ is an agitatable rake or ranging device D, consisting of a cross-head $h$, having thereon a series of teeth $t$ in line with the ridges $k$ and extending down to the surface of the chute, and in front of every alternate tooth is a ranging-blade $n$. This rake or ranging device is swung to and fro by suitable means, and the material which is received upon the upper part $p$ of the feed-chute is directed by the teeth and blades upon the ranging device into the channels $k^2$, and thus arranged in single-piece files. It will be seen that long pieces of material will not lie across adjacent teeth and choke the passage-ways $i$, but will be turned by the elongated teeth or ranging-blades and will slide into the channels.

The distributing-chute and ranging device may be moved or agitated by any suitable means, such as one or more arms $o$, connected to the ranging device and operated by a cam $e$ upon a shaft having a driving-pulley $m$. As shown in the drawings, an arm $g$ is secured to the side of the hinged ranging device and has an offset end upon which the end of the distributing-chute rests.

The lower end of the channeled feed-chute meets the surface of a transversely-arranged feed-roller E at the point $q$ above its axis at such an angle to the roller that the latter will prevent the pieces of material from sliding onto the roller; but the inclination of the part of the roller above the chute is slight enough to permit the pieces of material from the single-piece files to mount the roller as it turns, thus causing the rows of pieces to travel or feed only as fast as the surface of the roller travels. By properly regulating the speed of the roller the pieces of material from the several single-piece files within the channels may be fed one by one with substantially the same impetus to an adjoining section F of a differentiating slide, whereon they will be spaced apart lengthwise and widthwise of the slide during their passage down the slide, as shown in Fig. 1. Collisions between the pieces are thus averted.

The feed-roller is preferably driven by separate driving-belts in order that it may not be shaken by the vibrating parts of the feed mechanism. As shown, the roller is operated by cone-pulleys $z$ $z'$, by means of which the speed may be varied. For finer regulation of speed tapering pulleys may be substituted for the stepped cone-pulleys shown. All of the mechanism may be conveniently driven from a common shaft having tight and loose pulleys $x$, and the mechanism may be stopped and started by a suitable belt-shifter $x'$.

The supply of material to the feed-roller is automatically controlled by the arrangement of mechanism above described. As the weight of the pieces of material in the feed-channels rests principally upon the feed-chute and only lightly against the surface of the roller, which projects at the angle of repose, and as the mass of pieces within the secondary distributing-chute rests partly upon the bottom of the chute and partly against the ranging device the pressure of the material against the roller is not sufficient to cause a flow of pieces through the channels when the roller and the ranging device are stopped. The agitation of the distributing-chute $c'$ should also be stopped at the same time, so that the material will not accumulate in the hoppers B and C. As the distributing-chute and ranging device are in the drawings operated by a common agitating device the stoppage of one necessitates the stoppage of the other. Should the secondary distributing-hopper C become choked and partially filled, the material accumulated within said hopper will raise the distributing-chute $c'$ off of the arm $g$, and as the agitation of the chute will then cease the further feeding of the coal through the discharge-notches $d$ will be stopped. This in turn will stop the feeding of coal through the discharge-opening $b$ of the hopper A after the latter becomes partly filled. As the secondary distributing-hopper C is open at its upper end, and the hopper B is also open at the top, any obstructions occurring within said hoppers may be readily removed. The material also cannot be delivered to the feed-roller any faster than the surface of said roller travels. If, for instance, the feed-roller should stop or travel very slow, the material will accumulate in the secondary distributing-hopper C and lift the distributing-chute $c'$ off of the agitating-arm, thereby stopping the flow of material to the hoppers until the accumulation in the hopper C is fed out sufficiently to allow the distributing-chute to vibrate with the arm, when more material will enter the hopper.

Figures 6, 8, 9, 10, 11:
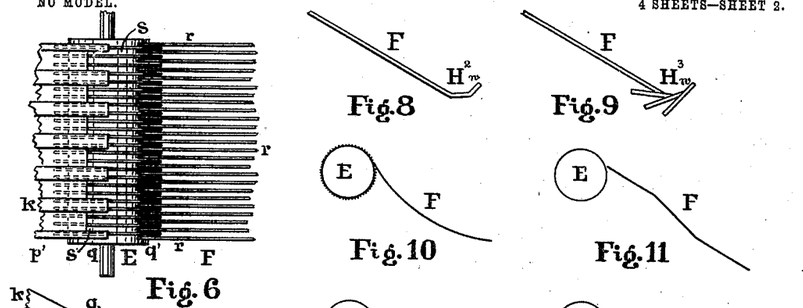
Fig. 6 is a top plan view of a grooved feed-roller and the adjacent ends of the channeled feed-chute and a frictional differentiating-slide, the latter being composed of grating the bars of which enter the grooves on the roller.
Figs. 8 and 9 are views showing modified forms of projectors.
Figs. 10, 11, 12, and 13 show various forms of differentiating-slides.
Figures 19, 20, 21, 22, 23, 24, 25:
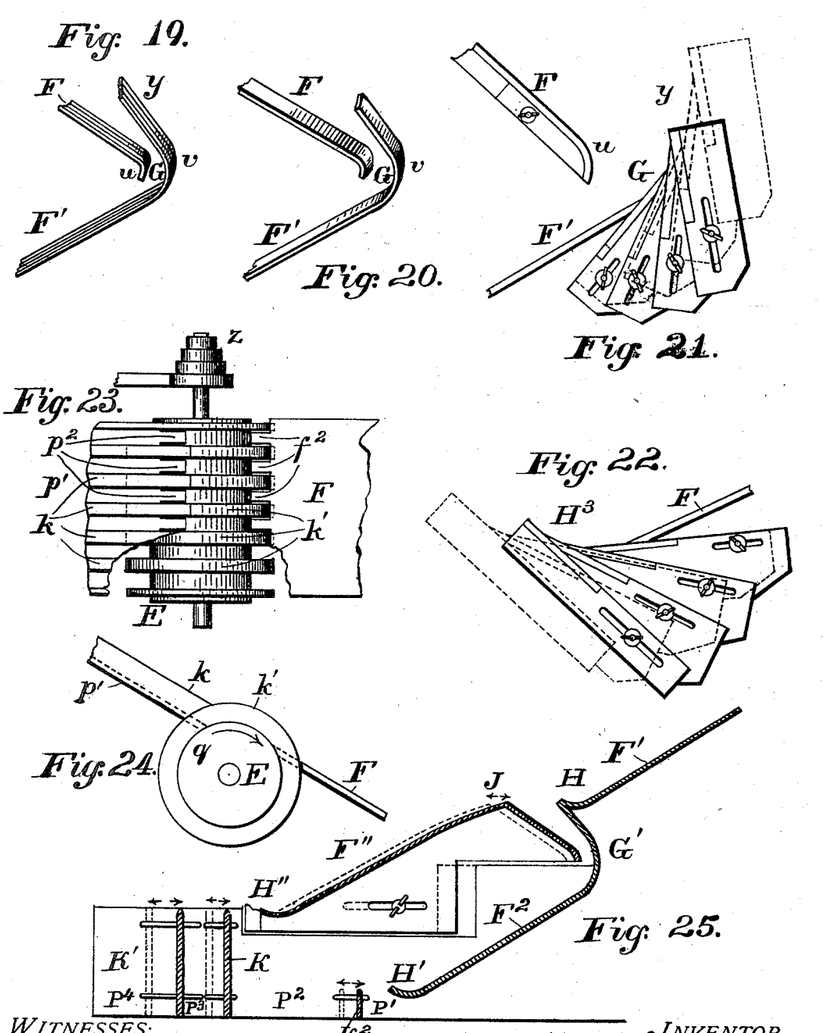
Fig. 19 is a view showing in perspective portions of adjacent slide-sections having their ends turned to invert the pieces of material, said slide being formed of parallel bars or gratings.
Fig. 20 is a similar view, in which the slide-sections have solid or flat surfaces.
Fig. 21 is a similar view, in which the end of the lower slide-section is adjustable.
Fig. 22 is a detail view showing an adjustable projector.
Figs. 23 and 24 are plan and side views showing a channeled feed-roller and the adjacent ends of the feed-chute and differentiating-slide.
Fig. 25 is a view showing a group of differentiating-slides similar to the group shown in the lower part of Fig. 2, the separating-partitions being adjustable.

The surface of the roller is preferably roughened or pronged to engage the pieces of material and carry them positively over its center, as indicated in Fig. 10, although a comparatively smooth surface will answer the purpose. Instead of providing a roller with a plain or roughened surface the roller may be formed with a series of grooves $s$, Figs. 6 and 7, into which the ends $q'$ of a series of parallel bars $r$, forming a slide-section F, project, or the grooves may be made of the same width as the channels in the feed-chute and arranged in line therewith, as shown in Figs. 23 and 24, the ridges $k$ upon the chute being in line with the ridges $k'$ upon the roller and the bottom of the chute having tongues $p^2$, which project into the grooves upon the roller. The grooves upon the roller thus form continuations of the feed-channels. With a roller of this construction the upper end of a slide-section is also provided with tongues $f^2$, which enter the grooves, as shown in Figs. 23 and 24.

Figures 7, 12, 13, 14, 15, 16, 17, 18:
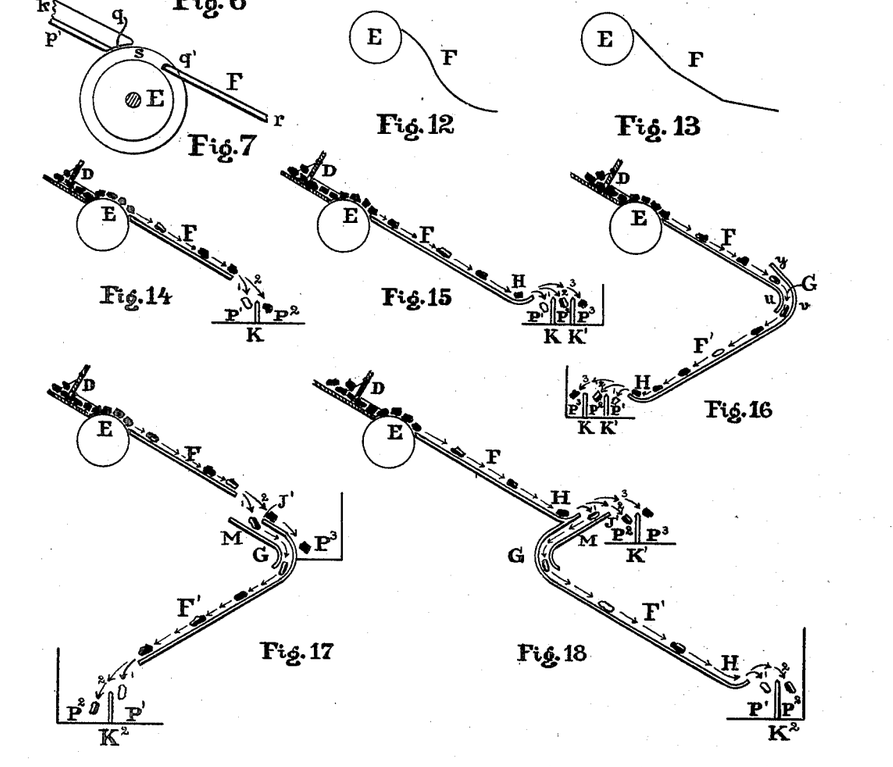
Fig. 7 is a side view of the same.
Fig. 14 is a view illustrating the operation of the single-piece-feeding mechanism without a projector or inverting means.
Fig. 15 is a similar view with a projector.
Fig. 16 is a similar view showing the operation with a projector and inverting means.
Fig. 17 is a similar view without a projector, showing an arrangement for separating out a part of the material and for inverting and separating the remainder.
Fig. 18 is a view showing a different arrangement of slides with projectors adapted for a similar purpose.

The frictional differentiating-slide may consist of a single section or of any desired number of sections, and the sections may be variously arranged, according to convenience and the fineness of the separation desired. The upper end of the slide-section adjacent to the feed-roller meets the roller a little below the top thereof, either tangential to the surface of the roller a little below the tangential line or intersecting the roller at a small angle, as illustrated in Figs. 6 and 7, by having tongues or bars entering grooves in the surface of the roller. The latter arrangement prevents pieces of material in passing from the roller to the slide from catching upon the upper end of the slide.

As plainly shown in Fig. 1, the pieces of material, fed apart from each other by the above-described feeding mechanism, in passing down the slide are spaced apart from one another lengthwise and widthwise of the slide. Each piece is given substantially the same impetus in passing from the roller to the slide, or it may be that the pieces will start upon the slide with practically no impetus from the roller, as where the slide is tangential to the roller. In any event all of the pieces are given practically the same start. The speed of the feed-roller is so regulated that a piece of material having the slowest speed upon the slide will not be overtaken by a succeeding piece of material having the fastest speed. In this way collisions between the pieces upon the slide are averted and each piece is permitted to acquire a velocity upon the slide which is due to its own peculiar properties—namely, its specific gravity and the frictional nature of its surface. The pieces of material upon leaving the lower end of the slide will fly or project therefrom to varying distances, depending upon their acquired velocities, and by arranging separating-partitions at the lower end of the slide crosswise of the stream of flying pieces the separation of the pieces into different grades may be accomplished. As a collision between two pieces of material upon the slide, such as a piece of coal and a piece of slate, which move at different velocities destroys the peculiar velocities of both pieces, it will be seen that a perfect separation cannot be obtained unless such collisions are prevented. Hence the separation will be more or less perfect, according to the perfection of the single-piece feeding.

Fig. 14 illustrates the operation when the pieces of material are fed apart from each other to a slide consisting of a single plane section F, near the lower end of which is arranged a single separating-partition K, which divides the stream of material passing from the slide into two parts, which enter separate receptacles, (represented by P' and P².) This figure illustrates a separator in its simplest form having the single-piece-feeding means.

Fig. 15 illustrates a separator having single-piece-feeding means and a projector H at the lower end of the slide, this projector consisting of a portion of the slide gradually elevated or turned upwardly relatively to the plane of the slide. When this curved projector is used, the individual and relative velocities of the pieces of material are not materially changed in passing over the projector, and the pieces leaving the projector fly much farther apart than they do from a slide like that shown in Fig. 14, where the projector is omitted, and a much better separation can therefore be effected. In this figure a pair of separating-partitions K K' separate the flying stream of pieces into three parts, which may be received in bins or receptacles, (indicated by P', P², and P³.)

Fig. 13 illustrates a separator combining in their simplest arrangement the three primary elements of the invention—namely, the single-piece-feeding means, the means for inverting the material during its passage down the slide, (indicated by the letter G and hereinafter described,) and the gradually-turned projector H at the lower end of the slide. In this figure the slide comprises an upper section F, meeting the roller, and a lower section F', below the first section and sloping in an opposite direction thereto and preferably somewhat more steeply inclined. The lower end $u$ of the upper section is turned gradually downward toward the lay of the lower section, and the upper part $v$ of the lower section extends around the lower end of the section F and upwardly toward the lay of said section, the arrangement being such that the pieces of material sliding down on the section F on one side will be inverted in passing through the inverter G without having their relative velocities materially altered, and such pieces will then move down over the section F' on sides opposite to the sides on which they slide on the section F. The velocities of such pieces therefore will be affected by the frictional nature of their opposite sides. Composite pieces, such as pieces of coal having slate on one side or pieces of slate having a film of coal on one side, will therefore acquire velocities different from that of pure coal or pure slate and will project into an intermediate pocket P², whereas if they moved down the entire distance on their coal sides or on their slate sides they would acquire velocities equal to or approaching that of pure coal or pure slate, as the case might be, and would fly mainly into the coal-pocket P³ or the slate-pocket P', some variation from this result occurring through the difference in the specific gravities of the pieces, which may be composed mainly of coal or mainly of slate.

Figures 26, 27, 28, 29:
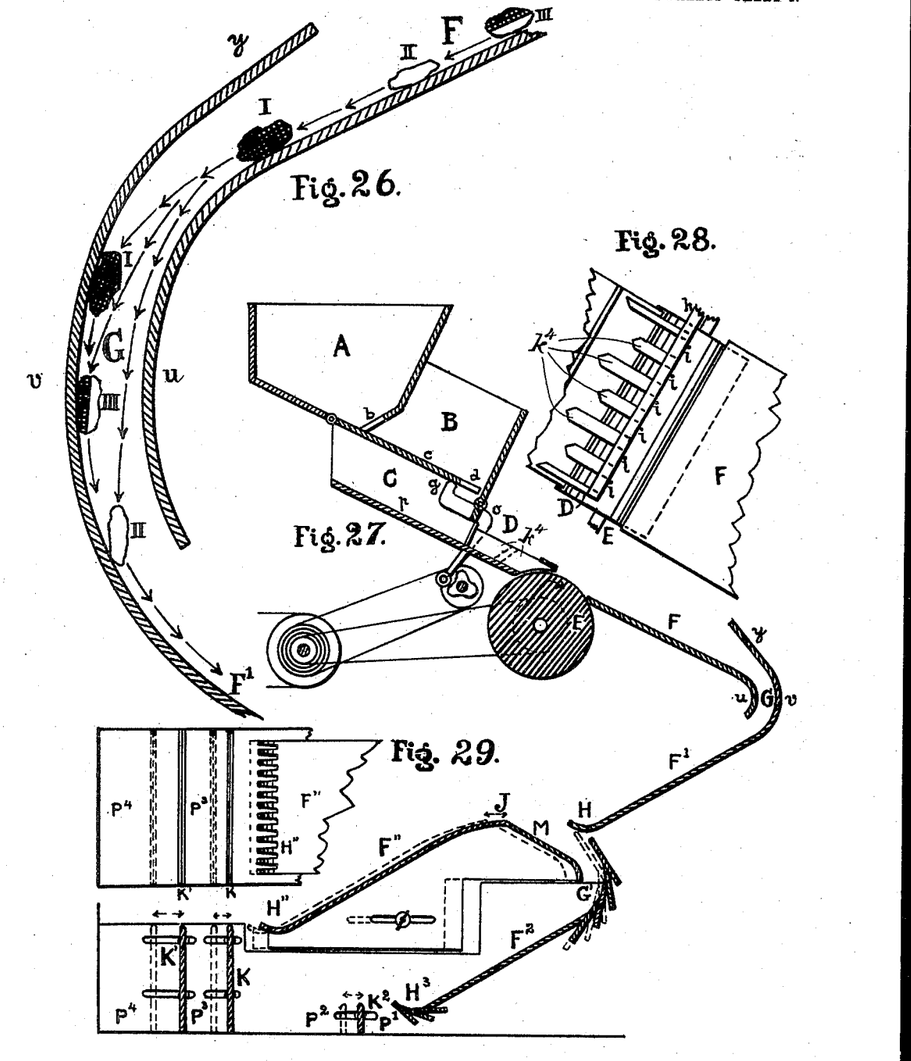
Fig. 26 is an enlarged sectional view through the portions of a slide in which the inversion of the material takes place, illustrating said operation.
Fig. 27 is a view similar to that shown in Fig. 2, showing a separator in which the ranging-rake is omitted and showing also an adjustable projector, adjustable separating-partitions, and an adjustable inverting device.
Fig. 28 is a plan view of a part of Fig. 27, showing the feed-roller, with the part of the feed-chute adjacent thereto.
Fig. 29 is a plan view of the lower left-hand portion of the separator shown in Fig. 27.

The course of the material in passing through the inverter and the design of the inverter are most clearly shown in Fig. 26, in which I represents pieces of coal, II pieces of pure slate, and III composite pieces of coal and slate. The arrows indicate the trajectories of these pieces in passing from the upper section F, and the curved part $v$ of the inverter is arranged to cut the trajectories of these pieces at similar large obtuse angles, so that the pieces in passing from the upper section to the lower one will strike the curved portion of the latter at substantially the same angle and will be gradually turned over, without having their relative velocities materially altered. The curved portion $u$ of the upper section is so formed that the slower-moving pieces remain in contact therewith longer than the faster-moving pieces, thereby diminishing the distance which the slower-moving pieces drop in passing from the upper to the lower section within the inverter. The acceleration of the several kinds of material in the inverter is thus made substantially the same. Thus a piece of pure coal I, which moves faster than the other material, leaves the section F at the upper part of the curve $u$, strikes the upper part of the inverting-plate $v$, and remains in contact therewith while passing through the inverter. A composite piece of coal and slate III, moving slower, travels farther down on the part $u$ and strikes the plate $v$ below the place where coal strikes, but at the same angle, and a piece of pure slate or rock II, moving still slower, remains in contact with the part $u$ longer than either of the other pieces and drops onto the plate $v$ at the same angle as the other pieces. Bone, of course, will strike the plate $v$ at a point below that where the pure coal strikes. A composite piece of coal or slate III which moves down the section F on its slate side will, as shown in this figure, be inverted and pass down the succeeding slide-section F' on its coal side, while a composite piece moving down the upper section on its coal side will pass down the lower section on its slate side. The speeds of such pieces, therefore, will be dependent upon the frictional nature of their opposite sides, as well as their specific gravities. Pieces which roll instead of sliding, such as the piece 12ª in Fig. 2, in passing through the inverter will have their rotation stopped and reversed and will be frictionally retarded in passing through the inverter, and will thus be prevented from overtaking and colliding with preceding pieces.

Referring again to Fig. 2 of the drawings, which shows a separator having a number of slide-sections arranged in upper and lower groups and having projectors and inverting means for effecting a very complete separation of coal, &c., F indicates the uppermost section of the slide upon which the coal is delivered from the feed-roller. Arranged below the section F and sloping in an opposite direction is a section F', and between these sections is an inverter G. At the lower end of the section F' is shown a curved projector H, and adjacent to this projector is a ridged separating-partition J, which partition is adjustable toward and from the projector, as indicated in dotted lines, Figs. 25 and 27. The sections F and F' form an upper group of sections, at the lower end of which a primary separation takes place. One side F'' of the ridged separating-partition, sloping in the same direction as the section F', forms a continuation of the slide and is provided with a projector H'' at its lower end, adjacent to which are separating-partitions K K'. The opposite side M of the separating-ridge J, which also forms a part of the slide, serves as a receiver for part of the material passing over the projector H and directs this part into an inverter G' at the upper end of a slide-section $F^2$, which section is provided with a projector H' at its lower end, and adjacent to said projector is a separating-partition $K^2$. These separating-partitions K, K', and $K^2$ also are adjustable, as indicated in Figs. 25 and 27. The sections F'' and $F^2$ and part M constitute a lower group of sections, at the lower ends of which the final separation is effected. Of course other sections or groups of sections may be added, if desired, for finer separations. For the purpose of frictionally retarding the material stone or other plates Q, Q', and Q'' may, if desired, be inserted in various portions of the slide.

The pieces of coal, slate, &c., from anthracite mines are sufficiently flat or have so many flat surfaces that most of them will slide if placed upon a smooth declivous surface inclined at an angle of about twenty-five to thirty-five degrees. A few pieces of bone, stone, and coal, however, will roll. Pieces of pure slate 9, which are uniformly flat and heavy, will move down the upper slide-section F, Fig. 2, passing through the inverter G onto the slide-section F', and owing to the comparatively slow speed on the slide such pieces will not project over the ridged partition J, but will land upon the receiver M and be directed thereby through the inverter G' and passing over the slide-section $F^2$ will enter the slate-pocket P'. A composite piece of coal and slate moving down the section F on its coal side—as, for instance, the piece 10—will slide down the section F' upon its slate side and will land on the receiver M upon its slate side and will then pass through the inverter G' and down the section $F^2$ upon its coal side and will pass over the separating-partition $K^2$ into the pocket $P^2$. A composite piece, such as the piece $10^a$, which starts upon the slate side on the section F will pass down the section F' upon its coal side, thereby acquiring greater velocity than the piece 10, and will pass over the partition J, landing upon the part N of the slide-section F'' and from thence passing into the pocket $P^2$. The part N is not so steeply inclined as the remainder of the section, so that pieces landing thereon will move slower than pieces landing at points farther down the slide, and their velocities will be less than such pieces. The composite pieces, therefore, passing over the sections $F^2$ and F'' land in the same pocket $P^2$. Pieces of bone 11, which acquire greater velocities than the composite pieces, will pass from the section F' over the ridged partition J and land upon the section F'' at a point below the place where the composite pieces land, striking the more steeply inclined portion of said section and thence passing from said section over the partition K and into the pocket $P^3$. Pure coal 12, which travels faster than the other pieces, will after passing from the slide-section F' land still farther down on the section F'' and on account of its acquired velocity will pass over the separating partitions into the farthest pocket $P^4$. The courses taken by the slate, composite pieces, bone, and coal are indicated by the arrows 1, 2, 3, and 4, respectively. Pieces of bone or coal, such as the piece $12^a$, which tend to roll down the slide will have their rotation stopped and reversed in the inverter G, thus retarding such pieces somewhat and preventing them from colliding with preceding pieces.

The mass of mixed material placed in the receiving-hopper of the machine shown in Fig. 2 is thus separated according to the material of which it is composed. By providing other separating-partitions or differently adjusting these partitions the material may be differently graded. Where it is desirable, for instance, to permit a part of the bone to go in the pure-coal pocket, it is only necessary to adjust the partition K' to effect this result.

The slide-sections may be arranged in various ways.

In Fig. 17 two slide-sections are arranged in opposite directions and adapted for a partial separation of the material at the end of the upper section. The sections in this instance are illustrated without projectors. An inclined receiving-plate M is arranged below the lower end of the upper section, and the lower end of the receiving-plate is turned gradually toward the lay of the lower section F'. The upper part of the lower section extends around the curved end of the receiving-plate toward the lay of said plate, its end J' terminating a short distance from the end of the upper section and in a plane slightly below said section. The end J' thus serves as a separating-partition for the material passing from the upper section, and the part of the material which projects over or onto said end enters a pocket P³. The slower-moving pieces pass onto the receiver M and thence through the inverter G and along the lower section of the slide to the separating partition or partitions at its lower end, where it is further separated.

In Fig. 18 a projector H is arranged at the lower end of the upper section F, and the lower slide-section F' is arranged in the same general direction as the upper slide-section, the inverter in this instance consisting of a receiving-plate M, arranged adjacent to the projector H and sloping in an opposite direction to the slide-sections. The lower end of this receiving-plate is turned gradually toward the lay of the lower section, while the upper part of the lower section is turned gradually toward the lay of the receiver. Part of the material passing down the upper section is projected beyond the receiver, and thus separated from the moving stream of pieces, while the remainder, which constitutes the slower-moving pieces, land upon the receiver and pass through the inverter and down the lower slide-section, from which it is projected and reseparated. Any suitable number of separating-partitions may of course be arranged adjacent to any of the points where the material is projected or passes from the slide. In Fig. 17 the upper end J' of the lower slide-section serves as a separating-partition, while in Fig. 13 and also in Figs. 2 and 27 the end y serves as a sort of hood or deflector for preventing bounding pieces from leaving the slide at the inverter. In Fig. 18 the receiver M serves as a separating-partition.

The slide-surfaces may for some purposes vary in form, as indicated, for instance, by the diagrams Figs. 10 to 13, inclusive. The projectors also instead of being curved plates may be slightly angular, as shown in Figs. 8 and 9. In Fig. 8 the projector consists of a continuation of the slide, gradually turned upward relatively to the plane of the slide by having several large obtuse angles made therein, so that pieces of material passing over said projector will be retarded as little as possible. In Fig. 9 the projector consists of several plates or bars, of which the first one adjoins the slide and the others successively underlie each other and are arranged at large obtuse angles to one another. These bars or plates are relatively adjustable in order to adjust the height or length of the projector. The adjustment of the projector is more clearly illustrated by the dotted lines in Fig. 22. The curved portion at the upper end of a lower slide-section, which causes the inversion of the material, may also be made adjustable in a similar manner, as indicated in Figs. 21 and 27, the curved portions in such case consisting of a series of relatively adjustable plates, of which the first one adjoins the upper end of the section and the successive bars or plates underlie one another at large obtuse angles.

In Figs. 27 and 28 the ranging-rake is omitted, and the ridges $k^4$ upon the feed-chute are made alternately long and short. In this case the material passes directly from the secondary distributing-bin into the feed-channels, the longer pieces being turned by the alternately-elongated ridges. It is preferable, however, to provide the ranging-rake in order to agitate the material and insure its passage into the channels.

The projectors, as shown in Fig. 29, may be serrated or toothed in order to permit dust and water to pass through.

I regard as within the scope of my invention any combination with a declivous frictional differentiating-slide and one or more separating-partitions of means of whatever description for spreading the pieces of material apart from each other upon this slide in such manner as to permit said pieces to slide down independently of each other, these spreading means, however arranged or located, being considered the means or a part of the means for feeding the pieces of material apart from each other onto the slide.

By the term "inverter" as used in the accompanying claims I mean any form of device or devices constructed and arranged for the purpose of turning the sliding pieces of material over onto their opposite sides during their passage down the slide, so as to subject the pieces to the frictional resistance of their opposite sides while passing down the slide. This being an entirely novel feature, I do not desire to restrict myself to the specific structure shown, but to include all devices within the spirit of the invention.

I claim—

1. In a separator for lump material, the combination of a slide in one or more sections having declivous frictional differentiating-surfaces, means for feeding the pieces of material spaced individually apart from each other to said slide, and one or more separating-partitions adjacent to the lower end of the slide.

2. In a separator for lump material, the combination of a slide in one or more sections having declivous frictional differentiating-surfaces, means for feeding the pieces of material spaced individually apart from each other to said slide, and one or more adjustable separating-partitions adjacent to the lower end of the slide.

3. In a separator for lump material, the combination of a slide in one or more sections having declivous frictional differentiating-surfaces, a projector at the lower end of said slide, one or more separating-partitions adjacent to said projector, and means for feeding the pieces of material spaced individually apart from each other onto said slide.

4. In a separator for lump material, the combination of a slide having a declivous frictional differentiating-surface, devices for feeding the pieces of material spaced individually apart from each other onto said slide, means for automatically regulating the supply of material to said feeding devices, and one or more separating-partitions adjacent to the lower end of the slide.

5. In a separator for lump material, the combination with a slide having a declivous frictional differentiating-surface, and feeding means constructed and arranged to feed the pieces of material spaced individually apart from each other to the slide at such intervals as to preclude collisions between the pieces while upon the slide, of a projector at the lower end of the slide consisting of a part whose surface is gradually raised relatively to the lay of the adjoining surface of the slide, and one or more separating-partitions arranged adjacent to the end of said projector.

6. In a separator for lump material, a slide having a declivous frictional differentiating-surface, an inverter at an intermediate portion of the slide and one or more separating-partitions adjacent to the lower end of the slide.

7. In a separator for lump material, the combination with feeding means and a slide having a declivous frictional differentiating-surface, whereby the pieces of material passing along the slide acquire velocities peculiar to their properties, of an inverter at an intermediate portion of the slide, and one or more separating-partitions arranged adjacent to the lower end of the slide.

8. In a separator for lump material the combination with feeding means and a slide having a declivous frictional differentiating-surface, whereby the pieces of material passing along the slide acquire velocities peculiar to their properties, of an inverter having its parts so curved and arranged as to invert the pieces of material during their passage down the slide without materially altering their relative velocities, and one or more separating-partitions arranged adjacent to the lower end of the slide.

9. In a separator for lump material, the combination with feeding means and a slide having a declivous frictional differentiating-surface, whereby the pieces of material passing along the slide acquire velocities peculiar to their properties, of an inverter constructed and arranged to invert the pieces of material during their passage down the slide without materially altering their relative velocities, a projector at the lower end of the slide, and one or more separating-partitions arranged adjacent to the projector.

10. In a separator for lump material, the combination with feeding means and a slide having a declivous frictional differentiating-surface comprising upper and lower sections of an inverter at the adjacent ends of said sections, and one or more separating-partitions arranged adjacent to the lower end of the lower section.

11. In a separator for lump material, the combination of a slide having a declivous frictional differentiating-surface and comprising upper and lower sections, means for feeding the pieces of material onto the upper section, an inverter at the adjacent ends of said sections, a projector at the lower end of said slide, and one or more separating-partitions adjacent to the end of the projector.

12. In a separator for lump material, the combination of a slide having a declivous frictional differentiating-surface and comprising upper and lower sections, means for feeding the pieces of material spaced individually apart from each other onto the upper section, an inverter at the adjacent ends of said sections, a projector at the lower end of said slide, and one or more separating-partitions adjacent to the end of the projector.

13. In a separator for lump material, the combination of a slide having a declivous frictional differentiating-surface and comprising upper and lower sections, means for feeding the pieces of material spaced individually apart from each other onto the upper section, an inverter at the adjacent ends of said sections, and one or more separating-partitions adjacent to the lower end of the lower section.

14. A separator of the kind described comprising a slide in upper and lower sections having a declivous frictional differentiating-surface, one or more separating-partitions adjacent to the lower end of said upper section adapted to divide the stream of pieces crosswise, an inverter at the adjacent ends of said sections arranged to invert part of the material thus separated during its passage from the upper to the lower section and means for reseparating the inverted pieces.

15. In a separator for lump material, the combination of a slide in upper and lower sections having declivous frictional differentiating-surfaces, means for feeding the pieces of material spaced individually apart from each other onto the upper section, one or more separating-partitions adjacent to the lower end of said upper section and adapted to divide the stream of pieces crosswise, an inverter for inverting part of the material thus separated during its passage from the upper to the lower section and means for reseparating the inverted pieces.

16. In a separator of the kind described adjustable means for inverting pieces of material in passing from one section of a declivous slide onto a second section oppositely inclined to the first one, comprising a deflector on the upper end of the second section consisting of a series of short deflectors of which the first one underlies the said upper end of the second section at a large obtuse angle thereto, and of which the others follow each other similarly at large obtuse angles, each one projecting a short distance past the end of the preceding one, and made adjustable.

17. In a separator for lump material, the combination with a declivous frictional differentiating slide-section, of a projector at the lower end of the section consisting of a series of relatively adjustable deflectors arranged at large obtuse angles to one another, the first deflector in the series adjoining the lower end of the slide-section at a large obtuse angle thereto.

18. A separator for lump material comprising a slide in sections having declivous frictional differentiating-surfaces, a projector at the lower end of the upper one of said sections of the slide, one or more separating-partitions adjacent to the end of the projector and arranged crosswise through the stream of flying pieces projected from the said projector, means for inverting pieces of material separated by the said partitions, these means being interposed between the respective partitions and a following section of the said slide and consisting in a section at the upper end of said following section of slide gradually turning from the direction of the said upper end into the direction of the trajectories of the pieces of material which have left the preceding section of the slide, and continued in a gradually-turning form until the said trajectories have been intersected at small angles, and one or more separating-partitions adjacent to the lower end of the latter section of the slide.

19. A separator for lump material comprising a slide including an upper section and a group of lower sections, all having declivous frictional differentiating-surfaces, a ridged separating-partition adjacent to the lower end of said upper section, and two oppositely-sloping lower sections of the said slide extending from the sides of said separating-partition, each one of these lower sections being adapted to receive a part of the separated stream of pieces of material from said upper section, an inverter for inverting one part of the stream of pieces separated by said ridged partition, and means for reseparating all the pieces.

20. A separator for lump material comprising a slide including an upper section and a group of lower sections, all having declivous frictional differentiating-surfaces, an adjustable ridged separating-partition adjacent to the lower end of said upper section, and two oppositely-sloping lower sections of the said slide extending from the sides of said separating-partition, each one of these lower sections being adapted to receive a part of the separated stream of pieces of material from said upper section, an inverter for inverting one part of the stream of pieces separated by said ridged partition, and adjustable means for reseparating all the pieces.

21. A separator for lump material comprising a slide including an upper section and a group of lower sections, all having declivous frictional differentiating-surfaces, a projector on the lower end of said upper section, a ridged separating-partition adjacent to the end of this projector and two oppositely-sloping lower sections of the said slide extending from the sides of said separating-partition, each one of these lower sections being adapted to receive a part of the separated stream of pieces of material from said projector, an inverter for inverting one part of the stream of pieces separated by said ridged partition, and means for reseparating all the pieces.

22. A separator for lump material comprising a slide including an upper section and a group of lower sections all having declivous frictional differentiating-surfaces, a ridged separating-partition adjacent to the lower end of the upper section and two oppositely-sloping lower sections of said slide extending from the sides of said ridged partition, each one of these oppositely-sloping sections being adapted to receive a part of the separated stream of material from said upper section, an inverter for inverting one part of the stream of pieces separated by said ridged partition, a section of said slide subjoining an inverter, and separating-partitions adjacent to the lower end of each of the lowermost sections of said slide.

23. A separator for lump material comprising a slide including an upper section and a group of lower sections, all having declivous frictional differentiating-surfaces, a projector on the lower end of said upper section, a ridged separating-partition adjacent to the end of this projector and two oppositely-sloping lower sections of said slide extending from the sides of said separating-partition, each one of these sections being adapted to receive a part of the separated stream of pieces of material from said projector, an inverter for inverting one part of the stream of pieces separated by said ridged partition, a section of said slide subjoining this inverter, a projector on the lower ends of each one of the lowermost sections of said slide, and one or more separating-partitions adjacent to each one of these projectors.

24. A separator for lump material comprising a slide in sections having declivous frictional differentiating-surfaces, and arranged in upper and lower groups, an inverter for inverting the pieces of material in passing from the first upper section to the second upper one, a ridged separating-partition adjacent to the lower end of said second section and arranged for separating the stream of pieces from said second section into two parts, an inverter for reinverting part of such separated material, and means for finally reseparating all the pieces.

25. In a separator for lump material the combination of a slide comprising one or more sections having declivous frictional differentiating-surfaces, means for feeding the pieces of material spaced individually apart from each other onto said slide, a projector at the lower end of said slide, consisting of a portion of the slide the lay of whose surface is gradually raised relatively to the adjoining portion of the slide, and one or more separating-partitions arranged adjacent to the end of said projector.

26. In a separator for lump material, the combination of a slide comprising one or more sections having frictional differentiating-surfaces, an inverter constructed and arranged to invert the pieces of material during their passage down the slide without materially altering their individual velocities, a projector at the lower end of the slide, and one or more separating-partitions arranged adjacent to the projector.

27. In a separator for lump material, the combination of upper and lower declivous oppositely-sloping sections of a slide having frictional differentiating-surfaces, and a part at the upper end of the lower one of said sections gradually turned up substantially toward the direction of the lower end of the upper one of said sections and so formed and placed that pieces of material which have left the upper section will strike the said turned part at a small angle and be deflected and turned down, over, and around onto the said next section, and one or more separating-partitions adjacent to the lower end of the lower section.

28. In a separator for lump material, the combination of upper and lower declivous, oppositely-sloping sections of a slide having frictional differentiating-surfaces, and a part at the upper end of the lower one of said sections gradually turned up substantially toward the direction of the lower end of the upper one of said sections and extending around and above the said lower end, said turned part being so formed and placed that the pieces of material which have left the upper section will strike the said turned part at a small angle and be deflected and turned down, over, and around onto the said next section, the said part extending above the said lower end of the upper section being so placed as to deflect bounding pieces properly into the said turned part, and one or more separating-partitions adjacent to the lower end of the lower section.

29. In a separator for lump material, the combination of upper and lower declivous oppositely-sloping sections of a slide having frictional differentiating-surfaces, a part at the lower end of the upper one of said sections gradually turned down substantially toward the direction of the upper end of the lower one of said sections, and a part at the upper end of the lower section gradually turned up substantially toward the direction of the lower end of the upper section and so formed and placed that the pieces of material which have left the upper section and the said turned-down part at its lower end will strike the said turned-up part at a small angle and be deflected and turned down, over, and around onto the said lower section, and one or more separating-partitions at the lower end of the lower section.

ARTHUR LANGERFELD.

Witnesses:
HENRY A. KNAPP,
L. B. CARTER.